: United States Patent	(10) Patent No.: US 8,031,493 B2
Huang et al.	(45) Date of Patent:	Oct. 4, 2011

(54) METHOD AND APPARATUS FOR IMPROVING THE LIGHT LOAD EFFICIENCY OF A SWITCHING MODE CONVERTER

(75) Inventors: Pei-Lun Huang, Taoyuan County (TW); Liang-Pin Tai, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 785 days.

(21) Appl. No.: 12/155,771

(22) Filed: Jun. 10, 2008

(65) Prior Publication Data

US 2008/0310194 A1    Dec. 18, 2008

(30) Foreign Application Priority Data

Jun. 13, 2007 (TW) .............................. 096121409 A

(51) Int. Cl.
*H02M 3/335* (2006.01)
(52) U.S. Cl. .................................................... 363/21.18
(58) Field of Classification Search .................... 363/18, 363/19, 20, 21.01, 21.05, 21.1, 21.12, 21.13, 363/21.18; 323/222, 271, 282, 283, 284, 323/285
See application file for complete search history.

(56) References Cited

U.S. PATENT DOCUMENTS

| | | | | |
|---|---|---|---|---|
| 6,057,607 A * | 5/2000 | Rader et al. | ..................... | 307/11 |
| 6,657,417 B1 * | 12/2003 | Hwang | ......................... | 323/222 |
| 7,035,119 B2 * | 4/2006 | Koike | ............................. | 363/19 |
| 7,391,631 B2 * | 6/2008 | Shimada | ......................... | 363/89 |

* cited by examiner

*Primary Examiner* — Adolf Berhane
*Assistant Examiner* — Nguyen Tran
(74) *Attorney, Agent, or Firm* — Rosenberg, Klein & Lee

(57) ABSTRACT

A method and apparatus are provided for a switching mode converter to improve the light load efficiency thereof. The converter is thus operated with three modes by monitoring a feedback signal and a supply voltage. When the feedback signal indicates that loading gets light enough, the converter is switched from the first mode to the second mode, and during the second mode some cycles are skipped. If loading is too light, the converter is switched from the second mode to the third mode, and during the third mode more cycles will be skipped.

11 Claims, 6 Drawing Sheets

METHOD AND APPARATUS FOR IMPROVING THE LIGHT LOAD EFFICIENCY OF A SWITCHING MODE CONVERTER

FIELD OF THE INVENTION

The present invention is related generally to switching mode converters and, more particularly, to a method and apparatus for improving the light load efficiency of a switching mode converter.

BACKGROUND OF THE INVENTION

Nowadays, line frequency AC/DC power supply has been widely replaced by switching mode AC/DC converter. For a constant frequency pulse width modulation (PWM) AC/DC converter, it generally operates at 67 KHz or about 100 KHz. As is known, most of time an AC/DC converter is in light load or no load condition, such as standby mode or battery removed in charger. During such condition, output power is much reduced but power loss will not. This will lead to poor efficiency. Regulations have been made to limit power consumption under such condition. Under light load condition, switching loss dominates the overall power loss. The key to increase efficiency is to reduce switching frequency under light load. There are many arts related to light load efficiency improvement, for example U.S. Pat. No. 6,212,079 to Balakrishnan et al., U.S. Pat. No. 6,252,783 to Huh et al., and U.S. Pat. Publication No. 20030117813 of Hong et al. Methods to increase efficiency can be categorized into three groups: pulse skipping mode, off time modulation mode, and cycle skipping or burst mode.

FIG. 1 shows a flyback converter 100 with its primary controller 102. The converter 100 has a transformer TX and a power switch SW serially connected to a primary winding Lp of the transformer TX, and the controller 102 provides a switching signal S1 by its pin GATE to switch the power switch SW for power delivery to a secondary winding Ls of the transformer TX. The transformer TX further has an auxiliary loop Laux to provide a current Iaux to charge a capacitor Cvcc for providing a supply voltage Vcc to the controller 102, and an optocoupler 104 detects an output voltage Vout of the converter 100 to feed back a signal Vfb to a pin FB of the controller 102. The optocoupler 104 includes a transistor 106 optically coupled with a light emitting diode (LED) D2, and a compensation network 108 to compensate the input signal of the optocoupler 104. Besides operating the converter 100 in fixed frequency PWM and providing protection functions, the controller 102 has to take care of light load efficiency to meet regulation requirement.

For pulse skipping mode, as load decreasing, some pulses from the oscillator are skipped. In FIG. 2, waveforms 200 and 202 represent the switching signal S1 provided by the controller 102 at full load and light load, respectively. As load RL decreasing, the controller 102 enters pulse skipping mode and, as shown by the waveform 202, some pulses 2022 are skipped. However, the oscillator in the controller 102 still generates constant frequency clock as in normal load. As the number of the pulses in the switching signal S1 reduces, the switching times of the power switch SW consequently reduces. Skipped pulses can be limited to prevent the system from operating into audio frequency. The ripple control under light load is easy to achieve.

For off time modulation mode, as load decreases, off time is increased so the switching frequency is also reduced. The lighter the load, the longer the off time. In FIG. 3, waveforms 204 and 206 represent the switching signal S1 provided by the controller 102 at full load and light load, respectively. As shown by the waveform 206, as load RL decreases, the controller 102 increases the off time Toff of the switching signal S1. Generally, this method is applied in "quasi-resonant converter". In pulse skipping mode and off time modulation mode, the frequency can be continuously reduced.

For burst mode, due to isolation, feedback voltage Vfb instead of output voltage Vout is taken to judge loading and compare with upper limit and lower limit of burst mode control. In FIG. 4, waveforms 208 and 212 represent the switching signal S1 provided by the controller 102 at full load and light load, respectively, and waveform 210 represents the feedback signal Vfb. As the feedback signal Vfb reaches upper limit V_high, the oscillator clock and thereby the switching signal S1 are blanked. As the feedback signal Vfb reaches lower limit V_low, the oscillator clock and thereby the switching signal S1 are released. The output ripple can be controlled by adjusting the upper limit V_high and lower limit V_low. However, the burst mode may cause the controller 102 turning off abnormally when loading becomes further lighter or no load.

Therefore, it is desired a method and apparatus to improve the efficiency when a switching mode converter operates at much lighter load or no load.

SUMMARY OF THE INVENTION

An object of the present invention is to improve the light load efficiency of a switching mode converter.

According to the present invention, a controller operates a switching mode converter with three modes by providing a switching signal to switch a power switch of the converter. The first mode is for normal load condition, the second mode is for light load condition, and the third mode is for deep light load condition. The controller determines the mode according to a feedback signal and a supply voltage. The feedback signal is produced by monitoring the output voltage of the converter. The supply voltage depends on the switching of the power switch. The controller uses a clock to trigger the switching signal, and by blanking the clock or the switching signal, it may control the power transferred to the output of the converter. Thereupon, the present invention improves the light load efficiency to meet regulation limit.

According to the present invention, a method for improving the light load efficiency of a switching mode converter comprises operating the converter in such a way that in the first mode, if the feedback signal decreases to a lower threshold due to load decreasing, the converter is switched from the first mode to the second mode, if load further decreases to cause the supply voltage being lower than a lower limit in the second mode, the converter is switched from the second mode to the third mode, and in the third mode, if the feedback signal rises to an upper threshold due to load increasing, the converter is switched from the third mode to the second mode.

According to the present invention, an apparatus for improving the light load efficiency of a switching mode converter comprises a first comparator to compare the feedback signal with a lower threshold to determine a first comparison signal, a second comparator to compare the feedback signal with an upper threshold to determine a second comparison signal, a hysteretic voltage comparator to monitor the supply voltage to determine a third comparison signal, and a logic circuit to generate a signal according to the first, second and third comparison signals to blank the clock or the switching signal. In the second mode, the first and second comparison signals are used to determine to blank or release the clock or the switching signal. In the third mode, the third comparison signal is used to determine to blank or release the clock or the switching signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
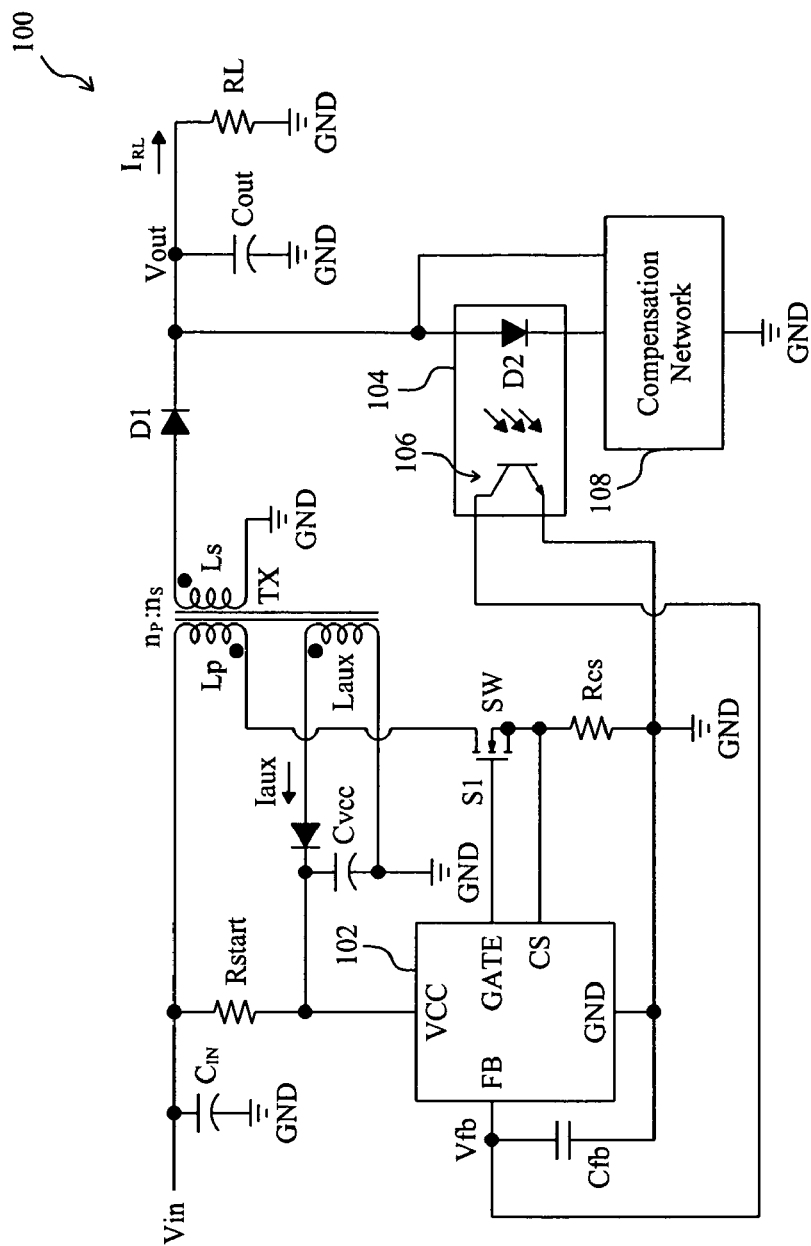
FIG. 1 is a flyback converter.
Figure 2:
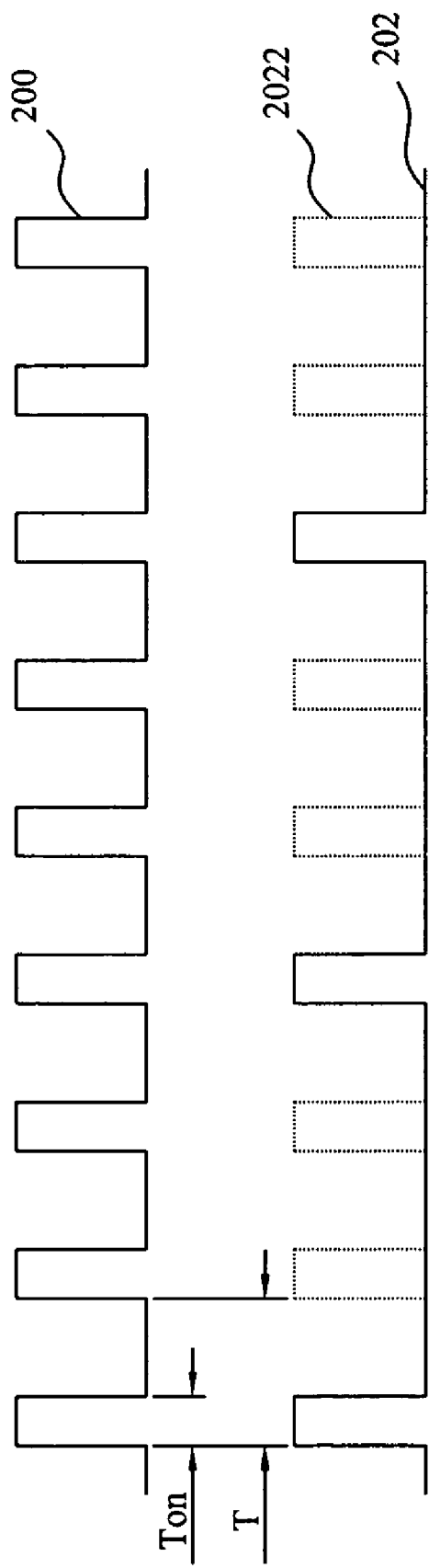
FIG. 2 is a waveform diagram showing the switching signal of the converter of FIG. 1 in pulse skipping mode.
Figure 3:
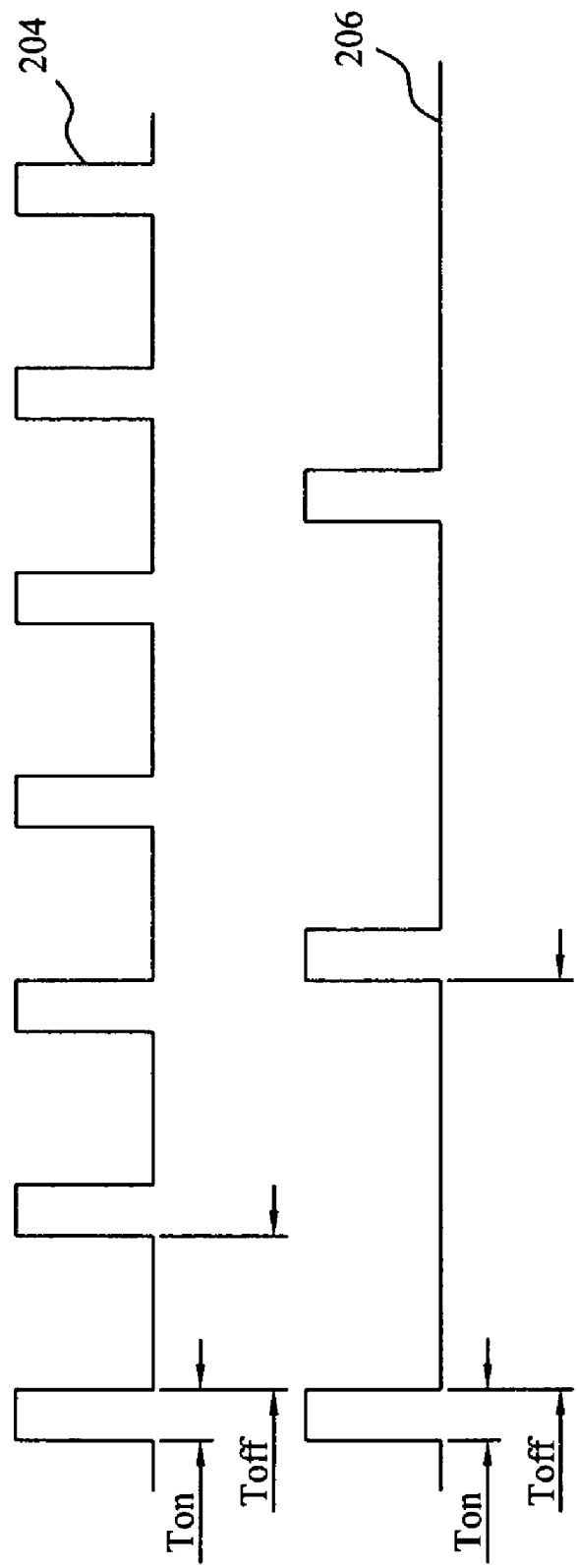
FIG. 3 is a waveform diagram showing the switching signal of the converter of FIG. 1 in off time modulation mode.
Figure 4:
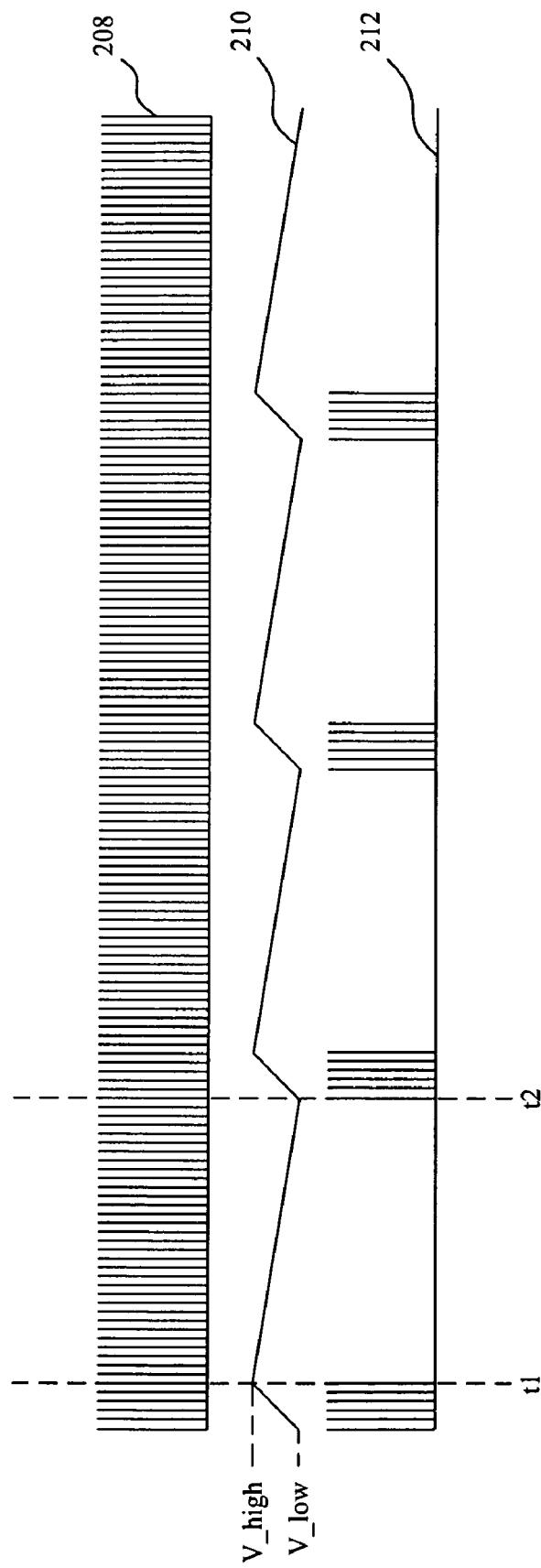
FIG. 4 is a waveform diagram showing the switching signal of the converter of FIG. 1 in burst mode.
Figure 5:
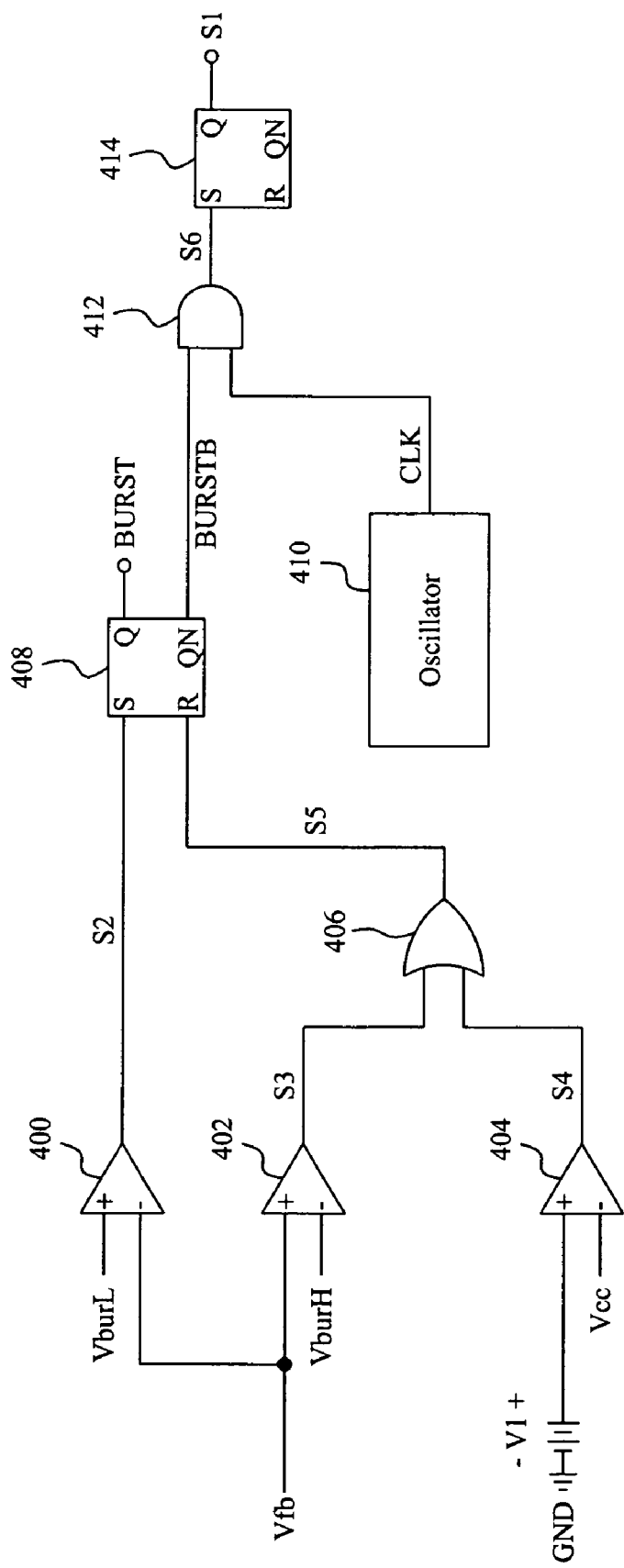
FIG. 5 is an embodiment according to the present invention.

FIG. 5 is an embodiment according to the present invention. Referring to FIGS. 1 and 5, a comparator 400 compares the feedback signal Vfb with a lower threshold VburL to generate a comparison signal S2 to set an RS latch 408, a comparator 402 compares the feedback signal Vfb with an upper threshold VburH to generate a comparison signal S3, a hysteretic voltage comparator 404 monitors the supply voltage Vcc to determine a comparison signal S4, an OR gate 406 generates a signal S5 according to the signals S3 and S4 to reset the RS latch 408, and the complimentary output BURSTB of the RS latch 408 is connected to an input of an AND gate 412 to blank the clock provided by an oscillator 410 in the controller 102 and thereby generate a signal S6 to set an RS latch 414, so as to determines the switching signal S1 to switch the power switch SW. Alternatively, it may use the complimentary output BURSTB to directly blank the output Q of the RS latch 414 for determining the switching signal S1. Other methods may also be applicable for determining the switching signal S1 as does the circuit of FIG. 5.

Figure 6:
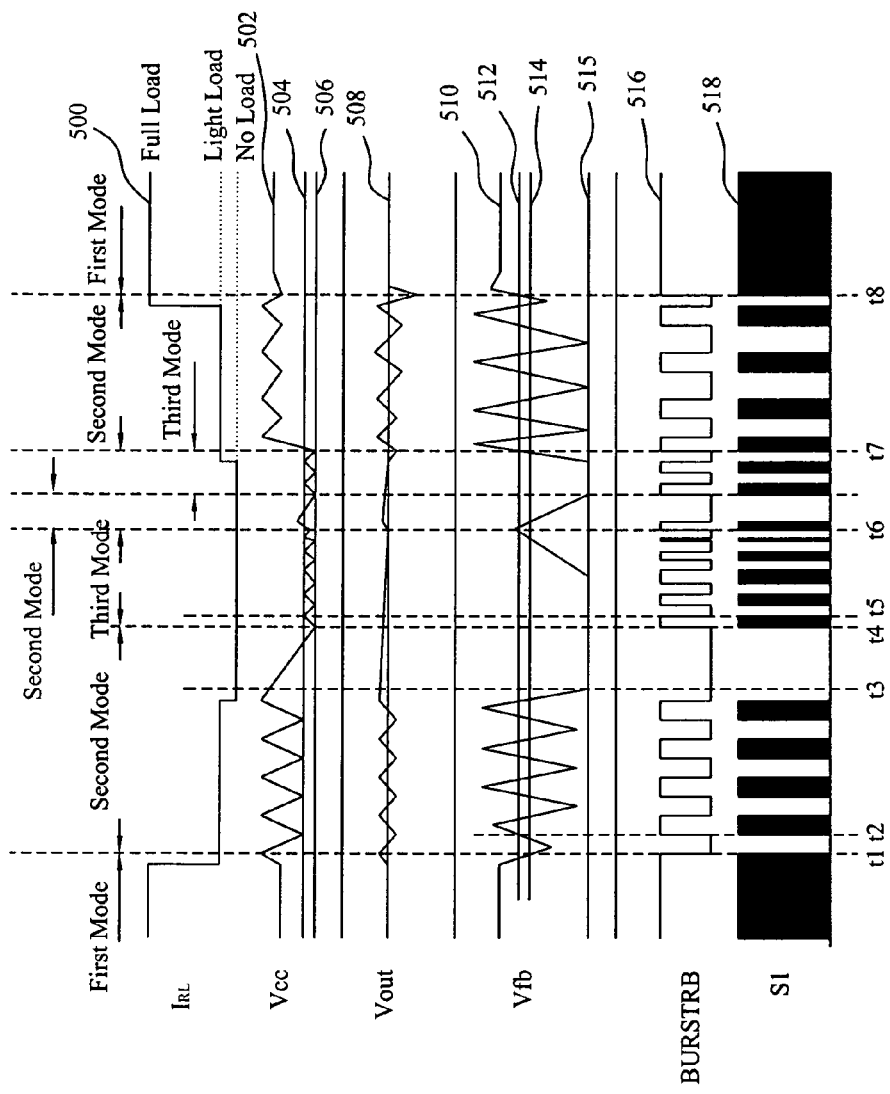
FIG. 6 is a waveform diagram showing the operation of the converter of FIG. 1 using the circuit of FIG. 5.

FIG. 6 is a waveform diagram showing the operation of the converter 100 of FIG. 1 using the circuit of FIG. 5, in which waveform 500 represents load current $I_{RL}$, waveform 502 represents the supply voltage Vcc, waveforms 504 and 506 represent the limits of the hysteresis band of the supply voltage Vcc, waveform 508 represents the output voltage Vout, waveform 510 represents the feedback signal Vfb, waveform 512 represents the upper threshold VburH, waveform 514 represents the lower threshold VburL, waveform 515 represents the minimum threshold Vfb_low of the feedback signal Vfb, waveform 516 represents the signal BURSTB, and waveform 518 represents the switching signal S1.

Referring to FIGS. 1, 5 and 6, before loading RL gets light and switching loss dominates the total loss, the converter 100 will operate at first mode. In this embodiment, the first mode uses a conventional constant frequency current mode PWM control and at this mode, the controller 102 will periodically switch the power switch SW, and the switching loss occupies not much in the overall power loss.

Since the converter 100 operates with current mode, the feedback signal Vfb can be used to monitor the loading RL. Unlike DC/DC converter, it can only sense the feedback signal Vfb to control the output voltage Vout instead of sensing the output voltage Vout directly. It's because of isolation requirement. As loading RL decreases, as shown in FIG. 6, the feedback signal Vfb falls down, and there are two thresholds VburH and VburL for monitoring the feedback signal Vfb for control. After the feedback signal Vfb reaches the lower threshold VburL, as shown at time t1, the loading RL is light enough to blank some cycles, and the converter 100 is switched to second mode. At this time, since the comparison signal S2 is high and the comparison signals S3 and S4 are low, the signal BURSTB transits to low and thereby blanks the clock CLK, and the switching signal S1 is not triggered any more.

During cycle blanking, the power switch SW will not be turned on, and energy is not transferred to the output Vout so the output voltage Vout drops. After the output voltage Vout drops below its setting value, the feedback signal Vfb increases. When the feedback signal Vfb reaches the upper threshold VburH again, as shown at time t2, the comparison signal S3 transits to high and thereby resets the RS latch 408, the signal BURSTB transits to high accordingly, and the clock CLK is released to trigger the switching signal S1. Thus PWM will be initiated again and the converter 100 operates at PWM control again. Generally, couple of pulses will be issued to make the output voltage Vout rise. Then the feedback signal Vfb drops to the lower threshold VburL again. At the second mode, loading RL determines blanked cycle number and issued cycle number. To control skipped cycle number in the second mode, the thresholds VburL and VburH can be adjusted.

As described in the above process, the second mode is a light load mode. After the feedback signal Vfb reaches the lower threshold VburL, if loading RL is too light, the output voltage Vout drops very slow and the feedback signal Vfb will reduce further. This will skip more cycles and there will be no energy transferred for a longer time, as shown between times t3 and t4. There will be two possible cases in the situation. In the first case, the supply voltage Vcc will not be charged during this interval. However, even no switching current consumed, there is still a steady current consumption to make the supply Vcc drop. Since the time constant of the capacitor Cvcc is much less than that of the output capacitor Cout, the supply voltage Vcc will drop to under voltage lock out (UVLO) turn off threshold and the converter 100 will be into Hiccup mode. Such situation is undesired since there might be a sudden load change during this interval. Therefore the band defined by the two hysteresis limits Vcc_high and Vcc_low, as shown by the waveforms 504 and 506 in FIG. 6, are set for the supply voltage Vcc, which is high than the turn off threshold of the supply voltage Vcc to force the power switch SW turn on between the two hysteresis limits 504 and 506. To prevent this action from effecting the output voltage Vout and generating audio noise, only little energy is transferred. At the time t4, the supply voltage Vcc reaches the lower limit Vcc_low, causing the converter 100 entering third mode, i.e. deep light load mode. The hysteretic voltage comparator 404 will trigger the signal S4 to reset the RS latch 408 and thereby cause the signal BURSTB transiting to high. Subsequently, the clock CLK is released to switch the power switch SW, and the supply voltage Vcc increases accordingly. Until the supply voltage Vcc reaches the upper limit Vcc_high, the signal S4 transits to low to blank the clock CLK again.

Since the transferred energy is quite little, the output voltage Vout generally will still drop. The other case is that the output voltage Vout drops to a level that makes the feedback signal Vfb rise to the upper threshold VburH, as shown at times t6 and t7. If so, the converter 100 will go back to the second mode. Although the converter 100 is switched back to the second mode form the third mode as a result of that the feedback signal Vfb reaches the upper threshold VburH at the time t6, the converter 100 will be soon switched back to the third mode again since the loading RL has not increased enough. After the loading RL increases enough to cause the feedback signal Vfb reaching the upper threshold VburH, as shown at the time t7, the converter 100 will be switched to the second mode from the third mode. If loading RL further increases to cause the feedback signal Vfb being greater than the upper threshold VburH, as shown at time t8, the converter 100 will be switched to the first mode from the second mode.

As illustrated by the above embodiments, the efficiency improvement mechanism is adjustable. Moreover, when a switching mode converter gets into very light load or no load, the cycles are further skipped to get better efficiency.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for improving the light load efficiency of a switching mode converter having a controller to provide a switching signal to switch a power switch so as to regulate an output voltage supplied for load, the controller using a clock to trigger the switching signal and receiving a supply voltage dependent on the switching of the power switch, the method comprising the steps of:

monitoring the output voltage to thereby generate a feedback signal; and operating the converter with a first mode, a second mode or a third mode according to the feedback signal and the supply voltage;

wherein during the first mode, if the feedback signal decreases to a lower threshold due to load decreasing, the converter is switched to the second mode from the first mode, and during the second mode, if loading further decreases to cause the supply voltage decreasing to a lower limit, the converter is switched to the third mode from the second mode.

2. The method of claim 1, wherein during the first mode the power switch is periodically switched by the switching signal.

3. The method of claim 1, wherein during the second mode the power switch is turned off for a period of time after each time it is continuously switched for a plurality of cycles.

4. The method of claim 1, wherein during the second mode the clock or the switching signal is blanked when the feedback signal decreases to the lower threshold and released when the feedback signal increases to an upper threshold.

5. The method of claim 1, wherein during the third mode the power switch is forced to be switched when the supply voltage is lower than the lower limit.

6. The method of claim 1, wherein during the third mode the clock or the switching signal is released when the supply voltage decreases to the lower limit and blanked when the supply voltage increases to an upper limit.

7. An apparatus for improving the light load efficiency of a switching mode converter having a controller to provide a switching signal to switch a power switch so as to regulate an output voltage supplied for load, the controller using a clock to trigger the switching signal and receiving a feedback signal dependent on the output voltage and a supply voltage dependent on the switching of the power switch, the apparatus comprising:

a first comparator for comparing the feedback signal with a lower threshold to thereby determine a first comparison signal;

a second comparator for comparing the feedback signal with an upper threshold to thereby determine a second comparison signal;

a hysteretic voltage comparator for monitoring the supply voltage to thereby determine a third comparison signal; and a logic circuit for generating a blanking signal according to the first, second and third comparison signals to blank the clock or the switching signal;

wherein the clock or the switching signal is blanked when the first comparison signal transits from a first state to a second state, and is released when the second comparison signal or the third comparison signal transits to a third state.

8. The apparatus of claim 7, wherein the logic circuit comprises:

an OR gate for generating a reset signal according to the second and third comparison signals; and an RS latch for generating the blanking signal according to the first comparison signal and the reset signal.

9. The apparatus of claim 7, wherein the power switch is periodically switched when the second comparison signal transits to the third state.

10. The apparatus of claim 7, wherein the power switch is turned off when the first comparison signal transits from the first state to the second state, and is periodically switched when the second comparison signal transits to the third state.

11. The apparatus of claim 7, wherein the power switch is forced to be switched for a plurality of cycles when the third comparison signal transits to the third state.

* * * * *